United States Patent [19]

Aidlin et al.

[11] Patent Number: 5,147,153

[45] Date of Patent: Sep. 15, 1992

[54] DUAL LANE AIR TRANSPORT ASSEMBLY

[76] Inventors: Stephen H. Aidlin, 1521 Eastbrook Dr., Sarasota, Fla. 34231; Larry Kincaid, 2635 Hyde Park St., Sarasota, Fla. 33579; Salvatore A. Uccello, 6527 Waterford Cir., Sarasota, Fla. 34238

[21] Appl. No.: 645,730

[22] Filed: Jan. 25, 1991

[51] Int. Cl.⁵ ...................... B65G 51/02; B65G 51/03
[52] U.S. Cl. ...................................... 406/86; 406/192
[58] Field of Search ...................... 406/86, 1, 88, 183, 406/192

[56] References Cited

U.S. PATENT DOCUMENTS

| | | | |
|---|---|---|---|
| 3,850,478 | 11/1974 | Hurd | 406/88 X |
| 4,284,370 | 8/1981 | Danler et al. | 406/86 |
| 4,822,214 | 4/1989 | Aidlin et al. | 406/88 X |
| 4,938,636 | 7/1990 | Aidlin et al. | 406/86 |
| 4,944,635 | 7/1990 | Carlier et al. | 406/183 X |
| 5,028,174 | 7/1991 | Karass | 406/86 X |

FOREIGN PATENT DOCUMENTS

| | | | |
|---|---|---|---|
| 344417 | 12/1989 | European Pat. Off. | 406/88 |
| 2580609 | 10/1986 | France | 406/86 |
| 9010587 | 9/1990 | World Int. Prop. O. | 406/86 |

*Primary Examiner*—Margaret A. Focarino
*Assistant Examiner*—James M. Kannofsky
*Attorney, Agent, or Firm*—Dominik, Stein, Saccocio, Reese, Colitz and Van Der Wall

[57] ABSTRACT

A pneumatic conveying apparatus for container bodies having neck rings. The apparatus comprises a plurality of pairs of laterally spaced neck tracks, each pair defining an elongated slot therebetween for slidably supporting container bodies by their neck rings and a plurality of inverted, U-shaped, interior channel members, each extending upwardly from one of the pairs of neck tracks spanning the slot and extending longitudinally substantially the length of the slot and having a cross sectional area sufficient to receive the portions of the container bodies above their neck rings, each interior channel member having a top wall and side walls with air directing louvers formed therein to provide a driving force for the container bodies. The apparatus further comprises an inverted U-shaped, exterior channel member extending upwardly from the neck tracks enclosing the plurality of interior channel members and extending longitudinally substantially the length of the slots, and pneumatic means to introduce air under pressure to the space between the exterior channel member and one of the interior channel members whereby such space may constitute a plenum chamber and direct a flow of air within the interior chamber in a direction dictated by the angle of the louvers for conveying container bodies supported by their necks on the neck tracks in the direction of the air flow.

6 Claims, 4 Drawing Sheets

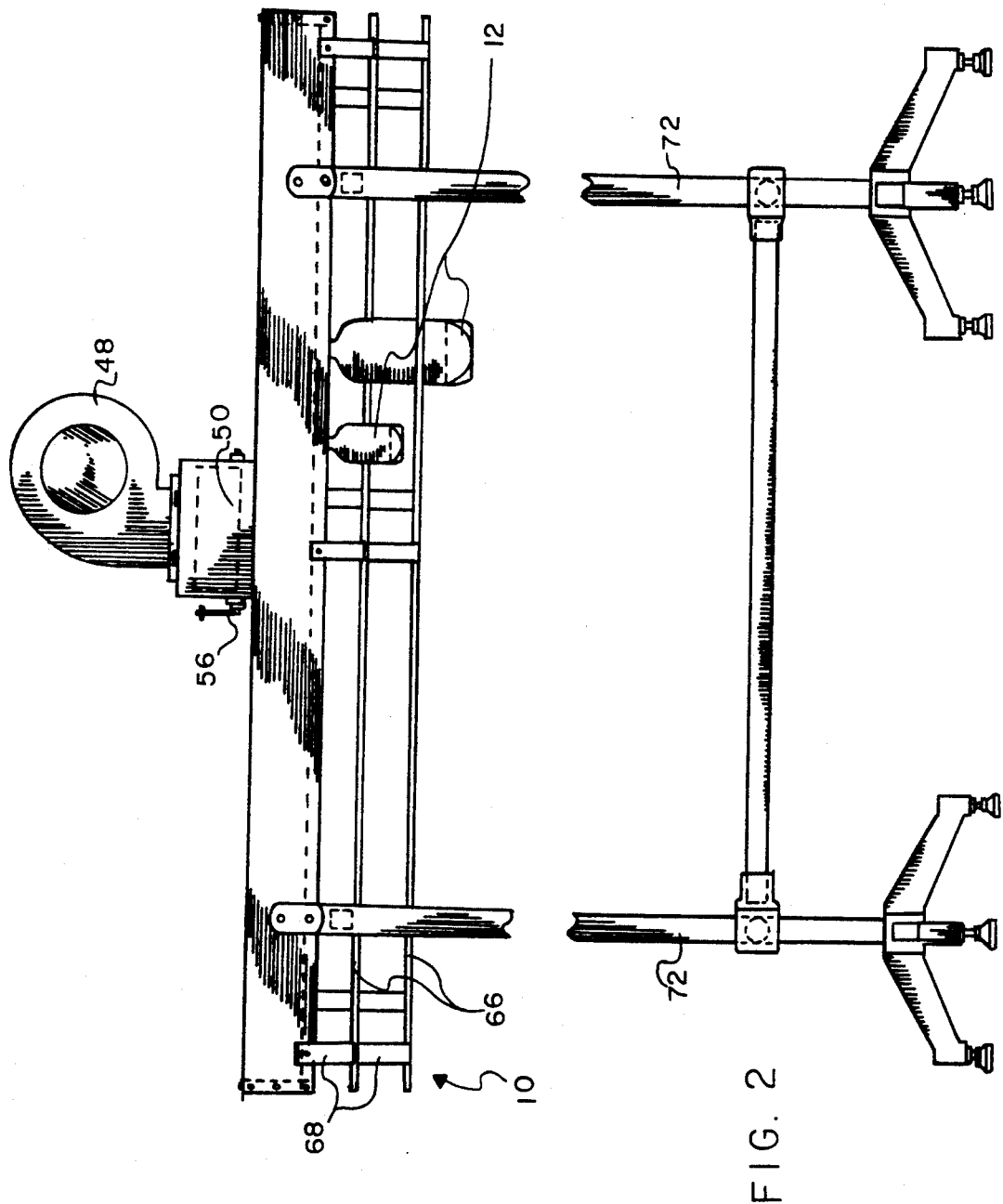

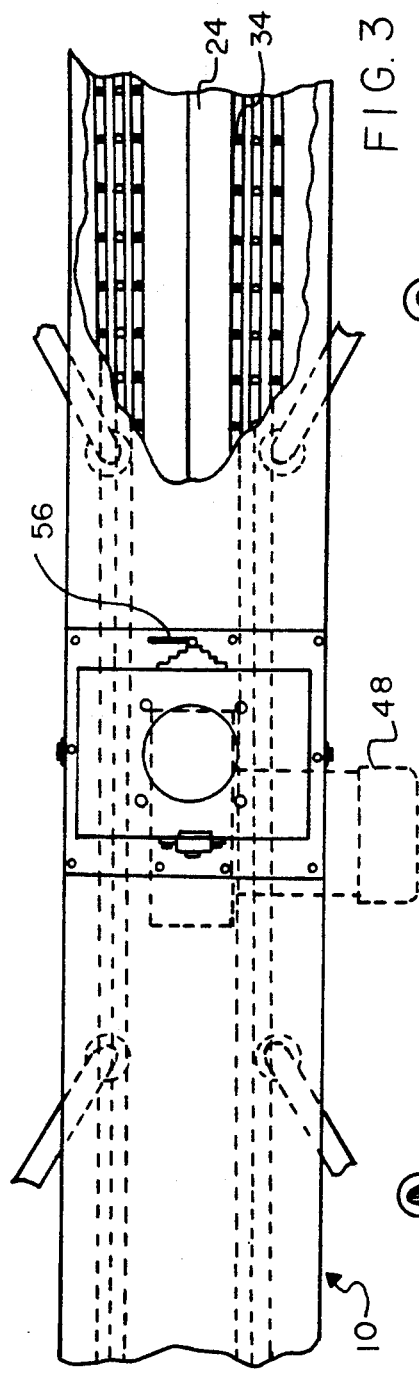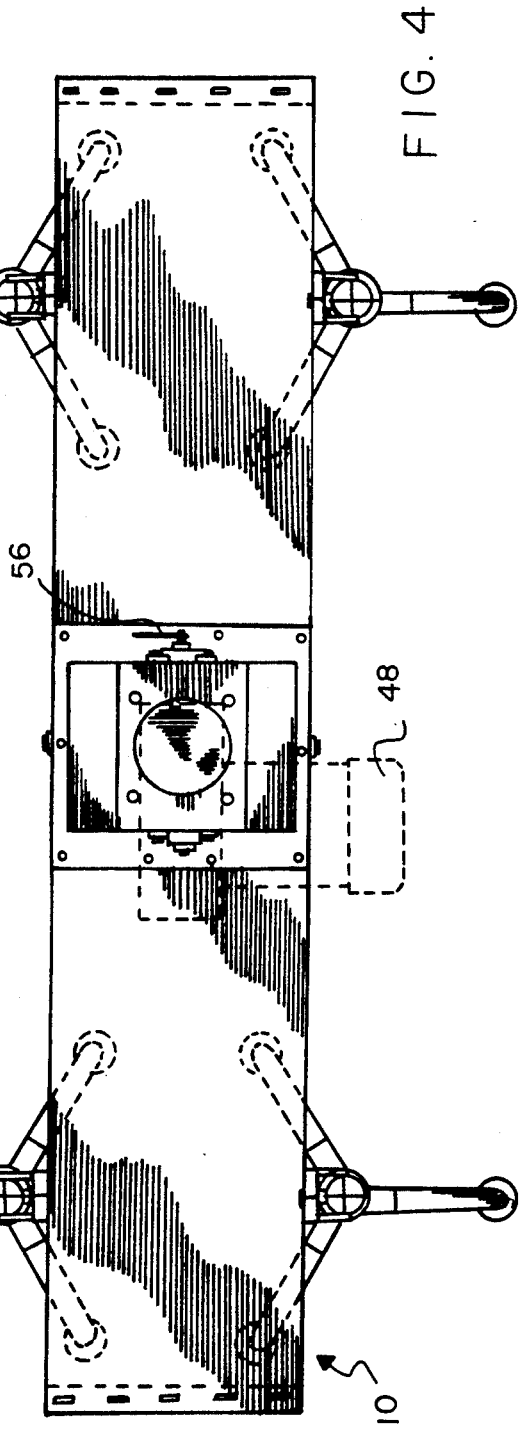

DUAL LANE AIR TRANSPORT ASSEMBLY

BACKGROUND OF THE INVENTION

1. Field of the Invention

This invention relates to a dual lane air transport assembly, and more particularly, to an improved apparatus for pneumatically transporting bottles with neck rings of different sizes along one or another of alternate feed paths.

2. Description of the Background Art

Many plastic bottles manufactured from thermoplastic synthetic resins are in wide use today throughout the carbonated beverage and other industries because of their advantages properties and the economical cost of manufacture. Such plastic bottles are usually formed from injection molded parisons having a threaded neck portion, a long slender body portion and a neck ring therebetween. The injection molded parison is blow-molded to its intended final size by positioning the parison in a blow-molding unit, applying heat to the body portion, and then injecting air into the parison for blow-molding to the desired shape.

Experience has shown that blow-molding flat bottomed plastic bottles are not satisfactory in terms of stability against deformation during use. Hence, virtually all blow-molded parisons include rounded bottoms to which is adhered a previously injection molded base cup. The base cup provides great stability and durability against deformation.

A typical base cupping machine for assembling base cups to round-bottomed plastic bottles is disclosed in U.S. Pat. No. 4,132,584 to Aidlin. This machine generally comprises a multilevel turntable having equispaced pockets about its periphery. During use, blow-molded plastic bodies are deposited into the recesses of the upper levels by means of a conveyor system interposed between the blow-molding machine and the turntable. Further downline of the turntable, a supply of base cups is deposited into the recesses of the lower most level. Then, during operation, the container bodies inserted within the upper levels of the turntable are forced downwardly by pneumatic cylinders into engagement with associated base cups below. The container bodies are then rigidly secured within the base cup prior to being deposited within the recesses of the turntable. The assembled plastic bottles are then ejected from the turntable for subsequent cleaning and filling with the desired beverage or the like.

The machine described above has been widely accepted throughout the industry. Unfortunately, a significant problem associated with that type of machine is the feeding of the container bodies. For example, the above-mentioned patent to Aidlin feeds both the container bodies and base cups to the base cupping assembly by mechanical conveyors. Such conveyors have performed their functions adequately in the past. More recently, however, container bodies have been fed pneumatically by flows of air which effect the intended conveying more efficiently than mechanical conveyors. Typical pneumatic conveyors for use in association with a base cup machine is described in U.S. Pat. No. 4,284,370 to Danler and U.S. Pat. No. 4,822,214 to Aidlin. However, pneumatic conveyors in use today, including those of the type disclosed in the above-described Danler and Aidlin patents, are made for conveying container bodies of but one specific size or, more particularly, for conveying container bodies with neck rings of one particular diameter. As a result, the operation and use of such known pneumatic conveyors is limited, of decreased efficiency.

As illustrated by the large number of prior patents and known conveying techniques, efforts are continuously being made in an attempt to convey articles such as container bodies more efficiently, conveniently, reliably and economically. None of these previous efforts, however, provides the benefits attendant with the present invention. Additionally, prior techniques do not suggest the present inventive combination of component elements as disclosed and claimed herein. The present invention achieves its intended purpose, objectives and advantages over the prior art devices through a new, useful and unobvious combination of component elements which is simple to use, with the utilization of a minimum number of functioning parts, at a reasonable cost to manufacture and use and by employing only readily available components.

It is therefore an object of the present invention to provide an improved pneumatic conveying apparatus for container bodies having neck rings comprising a plurality of pairs of laterally spaced neck tracks, each pair defining an elongated slot therebetween for slidably supporting container bodies by their neck rings; a plurality of inverted, U-shaped, interior channel members, each extending upwardly from one of the pairs of neck tracks spanning the slot and extending longitudinally substantially the length of the slot and having a cross sectional area sufficient to receive the portions of the container bodies above their neck rings, each interior channel member having a top wall and side walls with air directing louvers formed therein to provide a driving force for the container bodies; an inverted U-shaped, exterior channel member extending upwardly from the neck tracks enclosing the plurality of interior channel members and extending longitudinally substantially the length of the slots, and pneumatic means to introduce air under pressure to the space between the exterior channel member and one of the interior channel members whereby such space may constitute a plenum chamber and direct a flow of air within the interior chamber in a direction dictated by the angle of the louvers for conveying container bodies supported by their necks on the neck tracks in the direction of the air flow.

It is yet a further object of the invention to pneumatically convey container bodies supported on one of a plurality of neck rail sets as a function of the size of the neck rings of the container bodies.

Lastly, it is an object of the invention to direct the air flow of a pneumatic conveyor to one conveyor path or another depending on the conveyor path to be utilized.

The foregoing has outlined some of the more pertinent objects of the invention. These objects should be construed to be merely illustrative of some of the more prominent features and applications of the present invention. Many other beneficial results can be obtained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention as defined by the appended claims taken in conjunction with the accompanied drawings.

SUMMARY OF THE INVENTION

The invention is defined by the appended claims with a specific embodiment shown in the attached drawings. For the purpose of summarizing the invention, the invention may be incorporated into an improved pneumatic conveying apparatus for container bodies having neck rings comprising a plurality of pairs of laterally spaced neck tracks, each pair defining an elongated slot therebetween for slidably supporting container bodies by their neck rings; a plurality of inverted, U-shaped, interior channel members, each extending upwardly from one of the pairs of neck tracks spanning the slot and extending longitudinally substantially the length of the slot and having a cross sectional area sufficient to receive the portions of the container bodies above their neck rings, each interior channel member having a top wall and side walls with air directing louvers formed therein to provide a driving force for the container bodies; an inverted U-shaped, exterior channel member extending upwardly from the neck tracks enclosing the plurality of interior channel members and extending longitudinally substantially the length of the slots, and pneumatic means to introduce air under pressure to the space between the exterior channel member and one of the interior channel members whereby such space may constitute a plenum chamber and direct a flow of air within the interior chamber in a direction dictated by the angle of the louvers for conveying container bodies supported by their necks on the neck tracks in the direction of the air flow.

The conveying apparatus further includes guides in the form of rods suspended from the neck tracks on opposite sides of the slots along the lengths of the slots to preclude the lateral movement of container bodies being conveyed. The plurality of neck tracks are in a common horizontal plane. The conveying apparatus further includes a transition assembly between the exterior channel member and the pneumatic means. The transition assembly includes a butterfly plate alternately positionable to direct the air flow to one interior channel or the other.

The invention may also be incorporated into an improved pneumatic conveyor for articles having an enlargement comprising a plurality of pairs of laterally spaced tracks, each pair defining an elongated slot therebetween for slidably supporting an article by its enlargement; a plurality of inverted, U-shaped, interior channel members, each extending upwardly from one of the pairs of tracks spanning the slot and having a cross sectional area sufficient to receive the portions of the article thereabove, each interior channel member having a top wall and side walls with air directing louvers formed therein to provide a driving force for the article; an inverted, U-shaped, exterior channel member extending upwardly from the tracks enclosing the plurality of interior channel members and extending longitudinally substantially the length of the slots, and pneumatic means to introduce air under pressure to the space between the exterior channel member and one of the interior channel members; a transition module between the exterior channel member and the pneumatic means with a butterfly plate positionable between two positions whereby the spaces adjacent the interior channel members may constitute a plenum chamber and direct a flow of air within an interior chamber in a direction dictated by the position of the butterfly plate and the angle of the louvers for conveying an article supported by its enlargement on the tracks in the direction of the air flow.

The foregoing has outlined rather broadly some of the more pertinent and important features of the present invention in order that the detailed description of the invention that follows may be better understood whereby the present contribution of the art may be more fully appreciated. Additional features of the invention will be described hereinafter which form the subject of the claims of the present invention. It should be appreciated by those skilled in the art that the conception and the specific embodiment disclosed herein may be readily utilized as a basis for modifying or designing other devices for carrying out the same purposes of the present invention. It should be appreciated by those skilled in the art that such equivalent structures do not depart from the spirit and scope of the present invention as set forth in the appended claims.

BRIEF DESCRIPTION OF THE DRAWINGS

For a more complete understanding of the nature and objects of the present invention, reference should be had to the following detailed description taken in conjunction with the accompanying drawings in which:

FIG. 2 is an elevational view of the conveying apparatus for the container bodies as shown in FIG. 1.

FIGS. 3 and 4 are a plan view of the conveying apparatus for the container bodies as shown in FIGS. 1 and 2.

Similar reference characters refer to similar parts throughout the several drawings.

DETAILED DESCRIPTION OF THE PREFERRED EMBODIMENT

Figure 1:
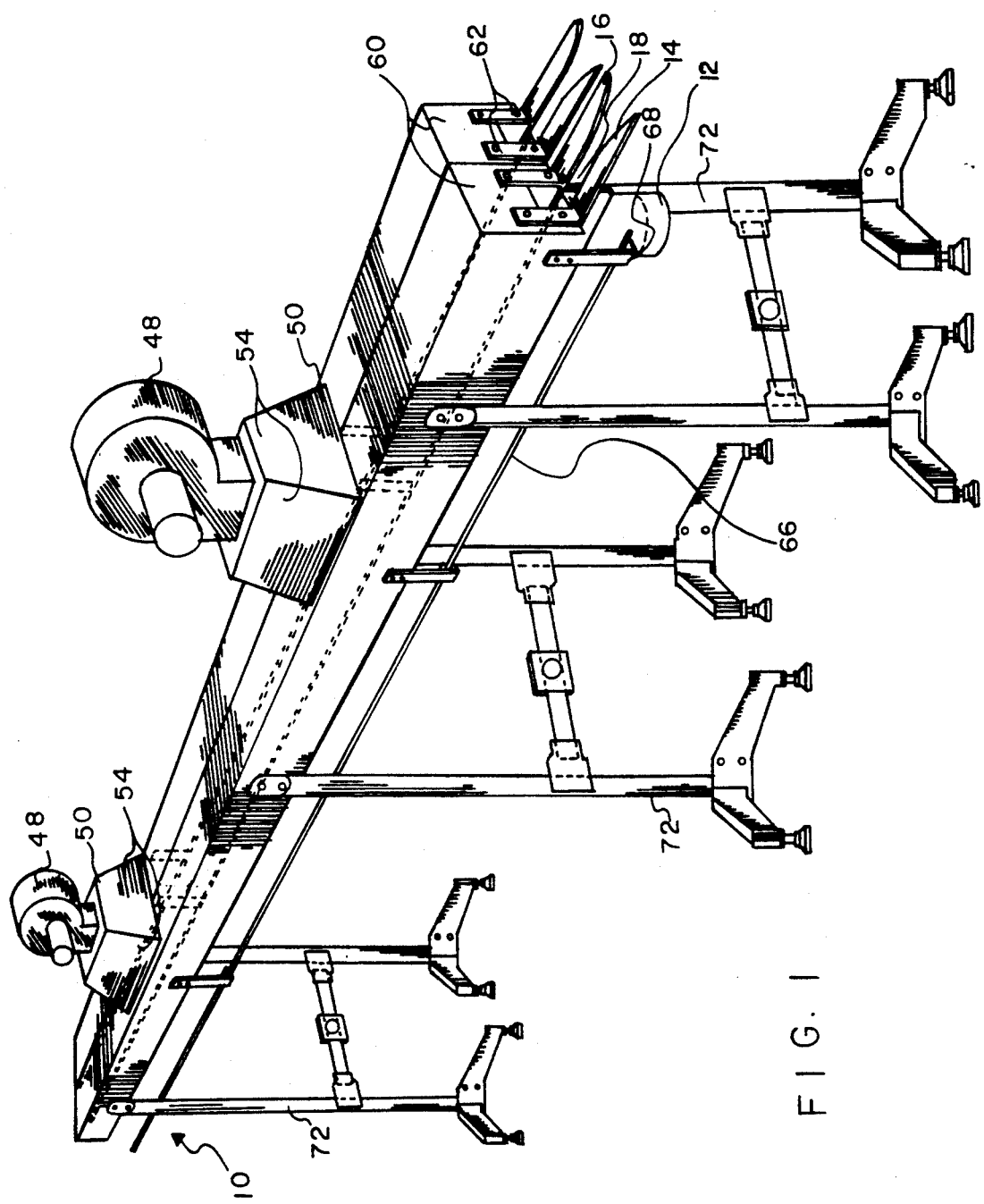
FIG. 1 is a perspective view of the pneumatic conveyor constructed in accordance with the principles of the present invention.

As illustrated in FIG. 1, the conveyor 10 of the present invention is intended primarily for use in association with machinery such as that for manufacturing molded soft-drink bottles, not shown. Further details of such machinery may be had by reference to the above-discussed U.S. Patents to Aidlin, the subject matter of which are hereby incorporated by reference herein.

The thin-walled round-bottomed container bodies 12 are preferably blow-molded from polyethylene terephthalate (PET), for example, which is impervious to gases and can therefore be used with carbonated beverages.

The pneumatic conveying apparatus or conveyor 10 includes a pair of parallel, laterally spaced neck rails or tracks 14 and 16. The space between the neck rails defines an elongated slot 18 for supporting and sliding a container body by its neck, a slightly enlarged portion of the container body at its upper end, along its path of travel from the input end to the output end. Neck track extensions 22 with tapered interior edges are positioned at the input end of the conveyor to assist in positioning container bodies onto the neck tracks. For the purpose of simplicity only one of the conveyors will first be described.

Mounted to the neck tracks is an inverted, U-shaped, interior channel member 24. This member projects upwardly from the tracks and spans the slot. It extends longitudinally along the feed path for substantially the length of the slot. It has a cross sectional area sufficient to receive the portion of a container body above its neck. The interior channel member has a horizontal top wall 26 and vertical side walls 28 secured to the neck tracks as by appropriate brackets 30. In addition, the top wall and side walls are all formed with air-directing louvers 34 and for effecting the movement of plurality of container bodies along the path of travel as will be explained hereinafter.

An inverted, U-shaped, exterior channel member 36 is also mounted on the upper surface of the neck tracks. The exterior channel member, like the interior channel member, projects upwardly from the path of travel and tracks and encloses the interior channel member. The exterior channel member extends longitudinally along the feed path substantially the length of the slot.

As can be seen most clearly in FIG. 4, additional utility is added to the apparatus by the incorporation of a second pair of neck tracks 40 and 42 parallel with the first and a second U-shaped interior channel 44 also parallel with the first. The second interior channel is substantially the same size and shape as the first but its neck supporting rails can be set as by adjustable bolts at a different separation space than the first. In the particular embodiment disclosed, the second rails are closer together than the first in order to accommodate supporting bottles of different sizes with different size neck rings supported thereon. Also in the preferred embodiment, the two pair of neck tracks are co-planar.

The inverted U-shaped exterior channel is of a greater enlarged size than had be previously utilized in the prior art in order to encompass the two pairs of rails and two interior channels along their entire length. A vertical separator plate divides the exterior channel into two segments, independent of each other, one for the first rail pair and one for the second rail pair. The exterior channel section for the first rail pair, that for larger bottles, has a larger cross sectional area and, consequently, volume than the second for the smaller bottles.

Figure 5:
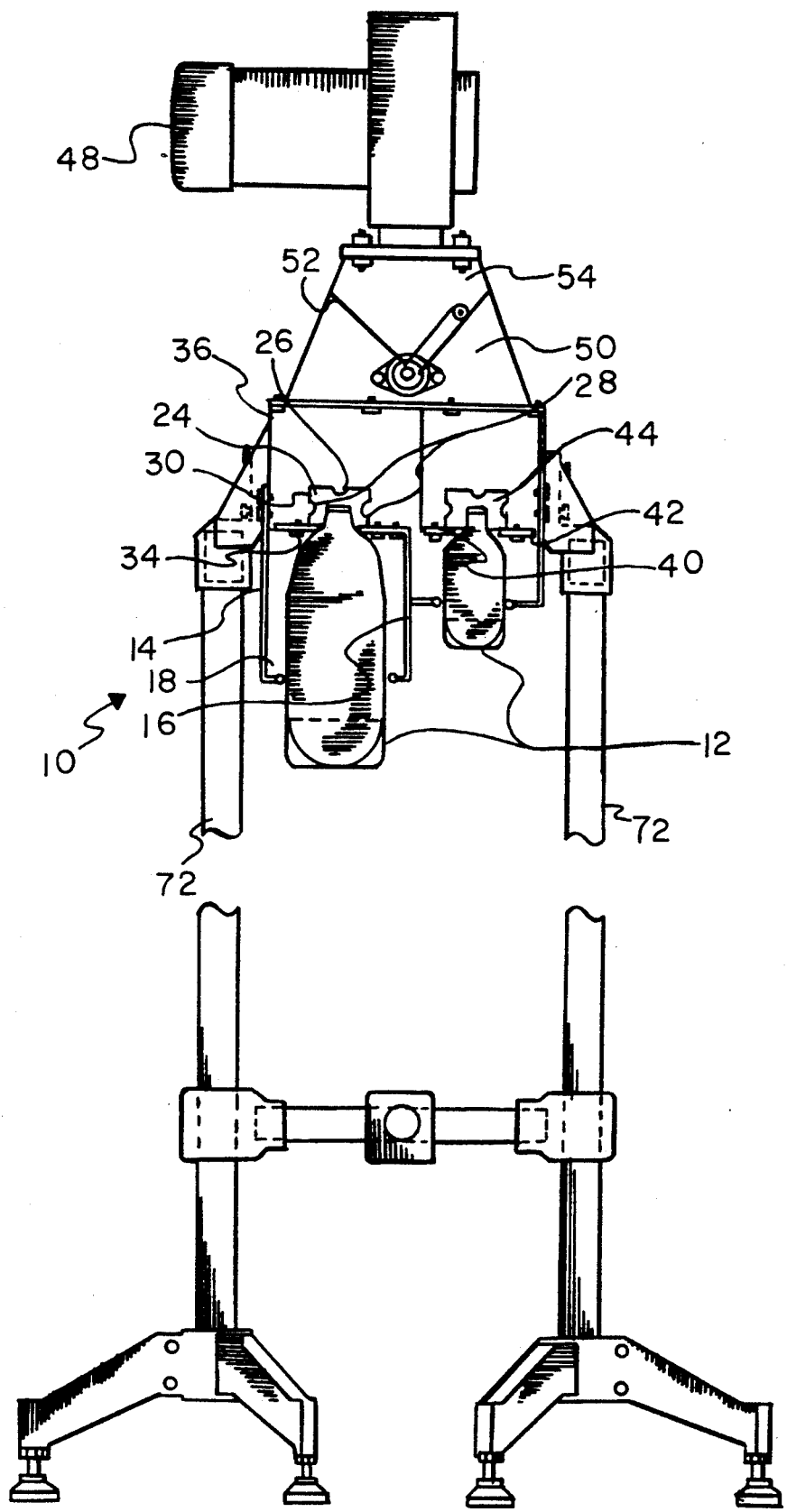
FIG. 5 is an end view of the conveying apparatus for the container bodies as shown in FIGS. 1, 2, 3, and 4.

Secured above the channels are a plurality of blowers 48 for creating the air flow required to convey the bottles. Intermediate the blowers and channels is a transition module 50 having a butterfly gate 52 positionable between two alternate positions. The gate is located in downwardly tapering side walls 54. When in the left hand position as shown in FIG. 5 as a solid line, all of the air from the blower will be directed to the second interior channel for moving bottles along the smaller tracks to the exclusion of the larger tracks. When, however, positioned to the right as shown in FIG. 5 as a dashed line, all of the air will be directed to the first or larger of the interior channel for conveying larger bottles to the exclusion of the smaller tracks. Movement of the butterfly gate is effected by a switching lever 56 exterior of each transition module as seen in FIGS. 3 and 4. Such lever may be operatal manually or electrically.

In operation and use, a plurality of pneumatic blowers 48 are positioned along the length of the upper face of the transition module 50 above the exterior channel member in fluid communication with the space therebeneath. Activation of the fans will introduce air under pressure to one of the spaces between the exterior and interior channel members whereby such space may constitute a plenum chamber which functions to direct a flow of air within the interior channel in a direction dictated by the angle of the louvers 34. The space receiving the air will be a function of the orientation of the butterfly gate 52. The flow of air will act to contact and convey container bodies supported by their necks on the neck tracks in the direction of the air flow.

Prior pneumatic conveyors 10, as for example those of the type described in the above-discussed patent to Danler, employ louvers only on the side walls of the interior channel. It has been found, however, that the addition of louvers to the top wall acts to retain the container bodies vertically during conveying for greater efficiency and smoothness of conveying with a reduction of stoppage due to misfeeding. It is thought that such additional louvers on the top wall of the interior channel do not merely increase the flow of conveying air but that such louvers tend to fill the container bodies with air, holding them down, and making conveying more efficient while minimizing their swinging in the plane of their direction of movement. Further, the arrangement of components of the conveying assembly of the present invention allows for the reduction in the size of the exterior channel member with reduced size, cost and noise along with improved performance.

The efficiency of the pneumatic arrangement is enhanced by end plates 60 secured to the ends of the exterior channel members 36 to abate air loss for maximizing efficiency. Brackets 62 couple the end plates to the neck tracks. Cut out areas are formed in the end plates to allow for the passage of the upper portions of conveyed container bodies onto, and from, the neck tracks of the conveying apparatus and through the interior channel member. Further, guides in the form of rods 66 are suspended by spaced guide mounts 62 from the exterior channel member and neck tracks. They are located on opposite sides of the slot along the length of the slot act to preclude the lateral movement of container bodies being conveyed. Parallel with the guide mounts, at spaced locations along the conveying apparatus, are telescoping support legs 72 for adjustably positioning the conveying apparatus with respect to the base cupping assembly and source of supply of container bodies.

The arrangement of closely spaced, parallel neck tracks allows a more efficient system of bottle manufacturing machinery of which the conveyor of the present invention is a part. In the past, when different sized bottle parts were to be fabricated and assembled, it was necessary to change the conveyor apparatus. This would leave half of the conveying apparatus out of service. With the present invention, the conveyor apparatus is in use continuously with the use of the system, accomodating different sized neck rings by a slight shift of the conveyor apparatus, thereby increasing the efficiency of both the conveyor apparatus as well as the system in which it is utilized.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and combination and arrangement of parts may be resorted to without departing from the spirit of the invention. Now that the invention has been described,

What is claimed is:

1. A pneumatic conveying apparatus for container bodies having neck rings comprising:
   two pairs of laterally spaced neck tracks, each pair defining an elongated slot therebetween for slidably supporting container bodies by their neck rings;

two inverted, U-shaped, interior channel members, each extending upwardly from one of the pairs of neck tracks spanning the slot and extending longitudinally substantially the length of the slot and having a cross sectional area sufficient to receive the portions of the container bodies above their neck rings, each interior channel member having a top wall and side walls with air directing louvers formed therein to provide a driving force for the container bodies;

an inverted U-shaped, exterior channel member extending upwardly from the neck tracks enclosing the interior channel members and extending longitudinally substantially the length of the slots, and pneumatic means to introduce air under pressure to a first space between the exterior channel member and only one of the interior channel members at a time to the exclusion of a second space between the exterior channel member and the other of the interior channel members whereby the first space constitutes a plenum chamber and directs a flow of air into said one of the interior channel members in a direction dictated by the angle of the louvers for conveying container bodies supported by their necks on the neck tracks in the direction of the air flow.

2. The conveying apparatus as set forth in claim 1 and further including guides in the form of rods suspended from the neck tracks on opposite sides of the slots along the lengths of the slots to preclude the lateral movement of container bodies being conveyed.

3. The conveying apparatus as set forth in claim 1 wherein the plurality of neck tracks are in a common horizontal plane.

4. The conveying apparatus as set forth in claim 1 and further including a transition assembly between the exterior channel member and the pneumatic means.

5. The conveying apparatus as set forth in claim 4 wherein the transition assembly includes a butterfly plate alternately positionable to direct the air flow to one of the interior channel members or to the other of the interior channel members.

6. A pneumatic conveyor for articles, each article having an intermediate enlargement and an upper portion thereabove and a lower portion therebeneath, the conveyor comprising:

two pairs of laterally spaced tracks, each pair defining an elongated slot therebetween for slidably supporting an article by its enlargement;

two inverted, U-shaped, interior channel members, each extending upwardly from one of the pairs of tracks spanning the slot and having a cross sectional area sufficient to receive the upper portions of the articles, each interior channel member having a top wall and side walls with air directing louvers formed therein to provide a driving force for the article;

an inverted, U-shaped, exterior channel member extending upwardly from the tracks enclosing the interior channel members to define spaces between the interior channel members and the exterior channel member and extending longitudinally substantially the length of the slots, and pneumatic means to introduce air under pressure to the spaces between and adjacent the exterior channel member and the interior channel members;

a transition module between the exterior channel member and the pneumatic means with a butterfly plate positionable between two positions whereby a space of said spaces adjacent to each interior channel member constitutes a plenum chamber and directs a flow of air into one interior channel member in a direction dictated by the position of the butterfly plate and the angle of the louvers for conveying an article supported by its enlargement on the tracks in the direction of the air flow.

* * * * *